(12) United States Patent
Ham et al.

(10) Patent No.: US 11,618,002 B2
(45) Date of Patent: Apr. 4, 2023

(54) LARGE CAPACITY NATURAL MATERIAL COMPOSITION CONVERSION APPARATUS USING MICROWAVE WITH PRESET PRESSURE FUNCTION

(71) Applicant: KOREA INSTITUTE OF SCIENCE AND TECHNOLOGY, Seoul (KR)

(72) Inventors: Jungyeob Ham, Gangneung-si (KR); Taejung Kim, Gangneung-si (KR); Bong Chul Chung, Seoul (KR); Sungdo Ha, Gangneung-si (KR); Seok Lee, Seoul (KR); Young Tae Park, Gangneung-si (KR); Pilju Choi, Gangneung-si (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 3 days.

(21) Appl. No.: 17/221,591

(22) Filed: Apr. 2, 2021

(65) Prior Publication Data
US 2021/0308648 A1 Oct. 7, 2021

(30) Foreign Application Priority Data
Apr. 3, 2020 (KR) ........................ 10-2020-0041074

(51) Int. Cl.
*B01J 19/12* (2006.01)

(52) U.S. Cl.
CPC .... *B01J 19/126* (2013.01); *B01J 2219/00141* (2013.01); *B01J 2219/00162* (2013.01); *B01J 2219/0805* (2013.01)

(58) Field of Classification Search
CPC ............ B01J 19/126; B01J 2219/00141; B01J 2219/00162; B01J 2219/0805; B01J 2219/1296; B01J 19/0006; B01J 19/0053; B01J 19/0066; B01J 2219/00058; B01J 2219/00094; B01J 2219/132; B01J 2219/00166; B01J 2219/0871;
(Continued)

(56) References Cited

U.S. PATENT DOCUMENTS 4,294,858 A * 10/1981 Moule ................. A23B 4/0056
219/686
5,211,106 A * 5/1993 Lucke ..................... F26B 15/12
219/400
(Continued)

FOREIGN PATENT DOCUMENTS

JP 2011-16061 A 1/2011
JP 5858340 B2 2/2016
(Continued)

*Primary Examiner* — Xiuyu Tai
(74) *Attorney, Agent, or Firm* — Birch, Stewart, Kolasch & Birch, LLP

(57) ABSTRACT

A large capacity natural material composition conversion apparatus using a microwave with a preset pressure function includes a chamber including a sealed reaction space accommodating a material, a radiator configured to heat the material by radiating a microwave into the reaction space, a pressure regulator configured to regulate a pressure of the reaction space by supplying a gas into the reaction space, and a controller configured to control the pressure regulator and the radiator, and preliminarily increase a pressure of the reaction space by controlling the pressure regulator before heating the material.

11 Claims, 10 Drawing Sheets

(58) Field of Classification Search
CPC .......................... B01J 2219/0879; B01J 19/24; B01J 19/1862; B01J 8/36; B01J 8/20; B01J 19/18; B01J 2219/1218; B01J 2219/1293; B01J 2219/1269; B01J 2219/187; B01J 2219/1245; B01J 2219/1215; B01J 2219/182; B01J 2208/00867; B01J 2219/1266; B01J 2219/00768; B01J 2208/00442; B01D 11/0207; B01D 11/0211; B01D 11/0257; C08J 11/10; C08J 11/12; H05B 6/701; H05B 2214/03; H05B 2206/045; H05B 6/78; H05B 6/707; H05B 6/806; H05B 6/802; C07C 67/03; C07C 67/08; C07C 69/24; C07C 69/58; Y02W 30/62; C10G 1/10; B08B 3/06; B08B 7/0021; B08B 3/12

See application file for complete search history.

(56) References Cited

U.S. PATENT DOCUMENTS

| | | | | |
|---|---|---|---|---|
| 5,368,171 | A | * | 11/1994 | Jackson ................. B08B 3/06 204/157.15 |
| 2006/0278254 | A1 | * | 12/2006 | Jackson ............. H01J 37/3244 257/E21.228 |
| 2012/0088885 | A1 | | 4/2012 | Krull et al. |
| 2012/0138601 | A1 | * | 6/2012 | Hemmings ............ B01J 19/126 219/679 |
| 2020/0047148 | A1 | * | 2/2020 | Ishizuka .................... B01J 8/20 |
| 2020/0398180 | A1 | * | 12/2020 | Hospodor ............. B01D 5/0054 |
| 2021/0122980 | A1 | * | 4/2021 | Bauer .................... B01J 19/126 |

FOREIGN PATENT DOCUMENTS

KR        10-1053560 B1     8/2011
KR    10-2018-0076491 A     7/2018

\* cited by examiner

LARGE CAPACITY NATURAL MATERIAL COMPOSITION CONVERSION APPARATUS USING MICROWAVE WITH PRESET PRESSURE FUNCTION

CROSS-REFERENCE TO RELATED APPLICATION

This application is based on and claims priority under 35 U.S.C. § 119 to Korean Patent Application No. 10-2020-0041074, filed on Apr. 3, 2020, in the Korean Intellectual Property Office, the disclosure of which is incorporated by reference herein in its entirety.

BACKGROUND

1. Field

Embodiments relate to a large capacity natural material composition conversion apparatus using a microwave with a preset pressure function, and more particularly, to a natural material composition conversion apparatus for extracting active ingredients contained in a natural material and performing composition conversion by heating and pressing the natural material by using a microwave.

2. Description of the Related Art

Methods that may be used to extract natural ingredients from natural products such as plants and animals include solvent extraction using an organic solvent and extraction using hot water. When an organic solvent is used, there is a concern about harmful effects on human body due to a residual solvent, and when hot water is used, there is a concern about decomposition or denaturation of ingredients due to damage by heat.

Recently, processing technology for extracting active ingredients of natural products by using a microwave heating device has been considered. Until now, research has been conducted on a device that extracts small amounts of natural products for the purpose of research in a laboratory or processes small amounts of natural products for home or small-scale producers.

When an attempt is made to develop a device for processing large amounts of natural products by using a microwave heating device, it may be generally expected that it is sufficient to simply change numerical elements for the design of the device by, for example, increasing the capacity of the device for extracting small amounts of natural products and increasing power required for heating.

However, processing conditions regarding a heating temperature and a heating time vary according to a kind of natural products to be processed, and as a size of a reaction space increases to process large amounts of natural products, an overall environment in which the natural products are heated changes. That is, when a large reaction space is created to process large amounts of natural products, it is more difficult to obtain extracts of uniform quality because environments such as a temperature and a pressure for processing the natural products vary according to positions inside the large reaction space.

Also, when large amounts of natural products are put into a large reaction space and then a large amount of power is supplied to a heater in order to quickly obtain large amounts of high-quality extracts from the natural products, the overall quality of the obtained extracts may be poor because some of natural product materials are excessively processed and others are not sufficiently processed. Also, when a large amount of power is supplied to a processing device without a plan in order to quickly complete a processing process, a temperature and a pressure in a reaction vessel may excessively increase, leading to a dangerous situation.

SUMMARY

Embodiments provide a natural material composition conversion apparatus using a microwave with a preset pressure function which is economical, safe, and suitable for mass production.

Also, embodiments provide a natural material composition conversion apparatus using a microwave with a preset pressure function which may process large amounts of natural materials in a sealed reaction space to produce uniform high-quality ingredients.

Additional aspects will be set forth in part in the description which follows and, in part, will be apparent from the description, or may be learned by practice of the presented embodiments of the disclosure.

According to an embodiment, a large capacity natural material composition conversion apparatus using a microwave with a preset pressure function includes a chamber comprising a sealed reaction space configured to accommodate a material, an radiator configured to heat the material by radiating a microwave into the reaction space, a pressure regulator configured to regulate a pressure of the reaction space by supplying a gas into the reaction space, and a controller configured to control the pressure regulator and the radiator, and preliminarily increase a pressure of the reaction space by controlling the pressure regulator before heating the material.

The large capacity natural material composition conversion apparatus may further include an agitator arranged in the reaction space and configured to agitate the material.

The large capacity natural material composition conversion apparatus may further include an auxiliary heater surrounding at least a part of the reaction space and configured to auxiliarily heat the material by transferring heat toward the reaction space.

The auxiliary heater may surround at least a part of an outer surface of the chamber, may be configured to generate heat being operated by an external electrical signal, and may be separable from the chamber.

The chamber may further include an internal mantle for forming at least a part of the reaction space, wherein the auxiliary heater is arranged inside the chamber to surround at least a part of an outer surface of the internal mantle, configured to generate heat being operated by an external electrical signal, and is separable from the internal mantle.

The controller may be further configured to control the radiator and the pressure regulator based on information on at least one of a heating temperature for heating the material in response to a kind of the material accommodated in the reaction space, a preliminary pressure condition to be formed in the reaction space, and a time for heating the material.

The material accommodated in the reaction space may be a mixture of a solvent and a natural product, and the controller may be further configured to control the radiator and the pressure regulator based on information on a preliminary pressure condition to be formed in the reaction space in response to a kind of the solvent.

The controller may be further configured to control the radiator and the pressure regulator based on information on a boiling point of the material accommodated in the reaction space.

The chamber may include a plurality of division chambers that are coupled to one another to form the reaction space, and the plurality of division chambers may be separable.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
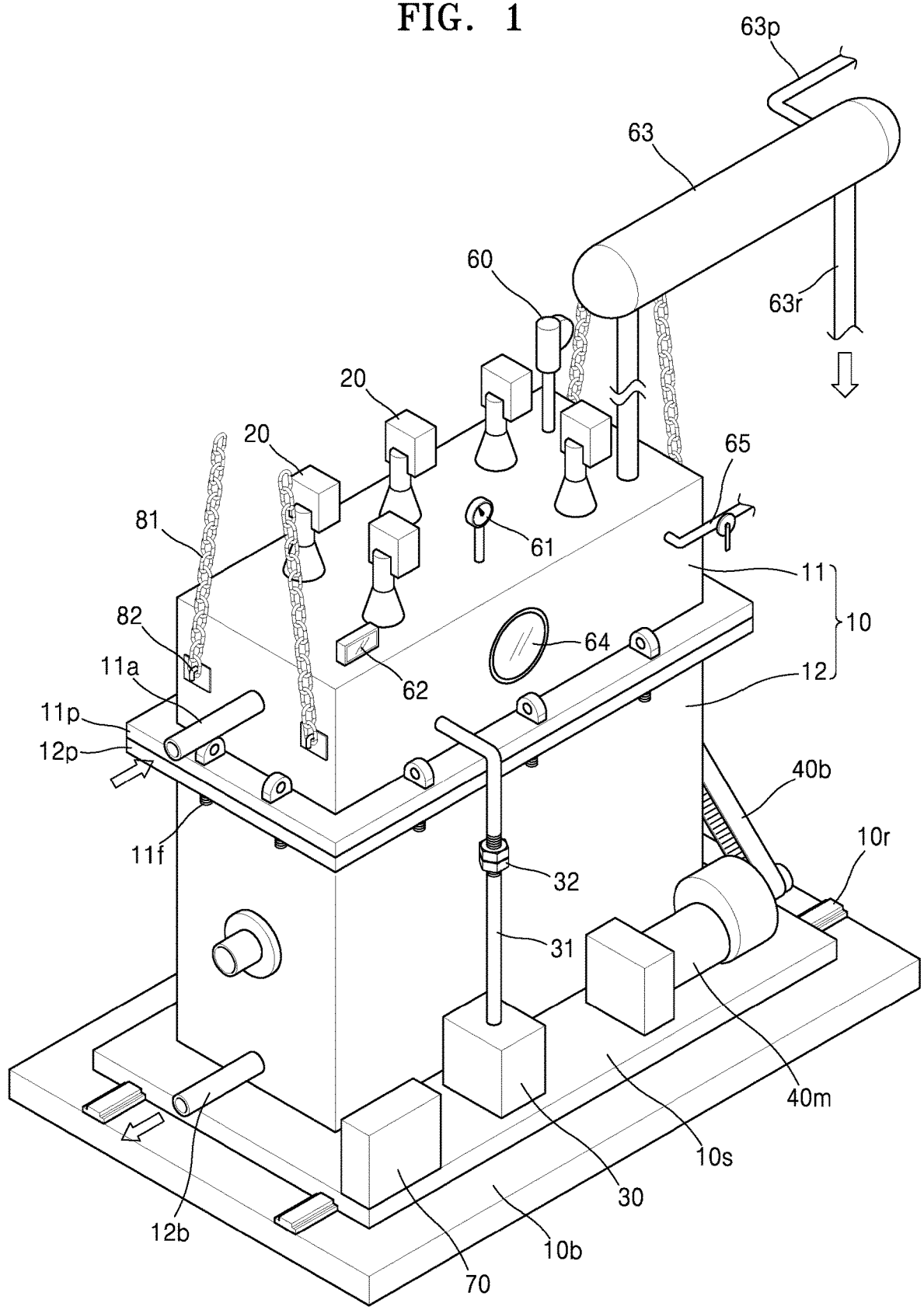
FIG. 1 is a perspective view illustrating a large capacity natural material composition conversion apparatus using a microwave, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The terms used herein are those general terms currently widely used in the art in consideration of functions in the present disclosure but the terms may vary according to the intention of one of ordinary skill in the art, precedents, or new technology in the art. Also, some of the terms used herein may be arbitrarily chosen by the present applicant, and in this case, these terms are defined in detail below. Accordingly, the specific terms used herein should be defined based on the unique meanings thereof and the whole context of the present disclosure.

It will be understood that when a certain part "includes" a certain component, the part does not exclude another component but may further include another component, unless the context clearly dictates otherwise. The term used in the embodiments such as "~ unit" or "~ module" indicates a unit for processing at least one function or operation, and may be implemented in hardware, software, or in a combination of hardware and software.

The present disclosure will now be described more fully with reference to the accompanying drawings for one of ordinary skill in the art to be able to perform the present disclosure without any difficulty. However, the disclosure may be embodied in many different forms and is not limited to the embodiments of the disclosure set forth herein.

Figure 2:
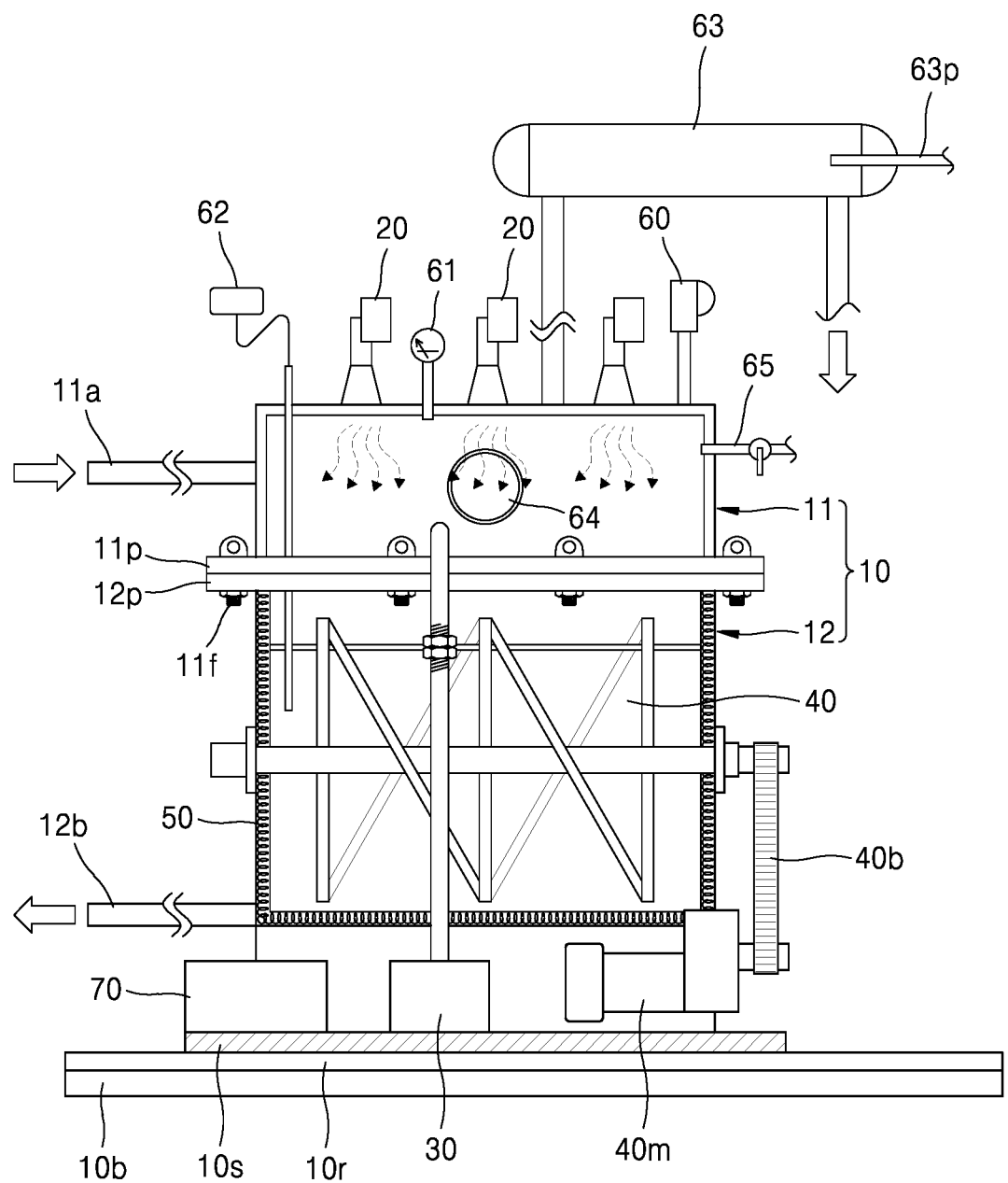
FIG. 2 is a front view illustrating the large capacity natural material composition conversion apparatus using the microwave of FIG. 1.
Figure 3:
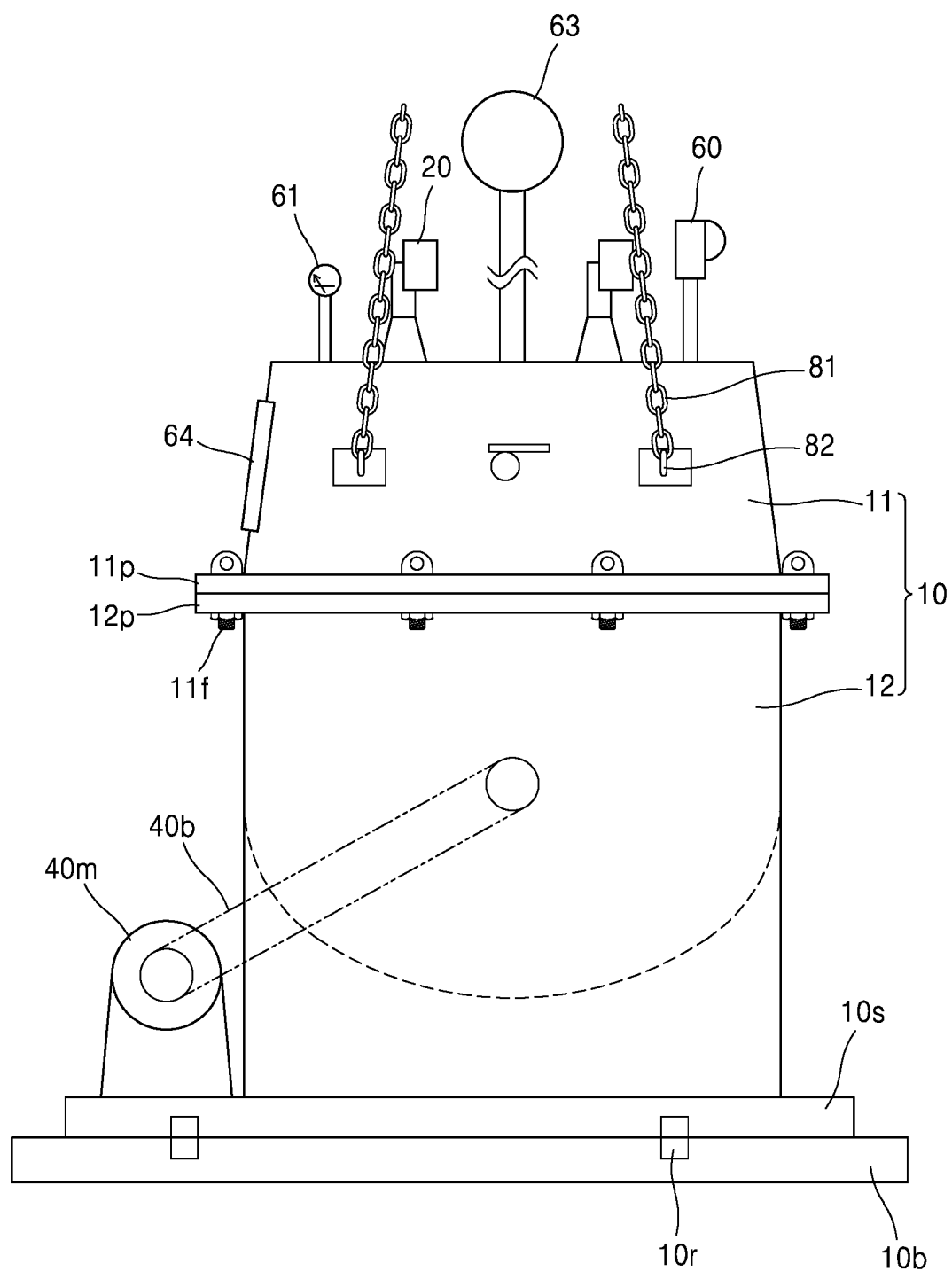
FIG. 3 is a side view illustrating the large capacity natural material composition conversion apparatus using the microwave of FIG. 1.
Figure 4:
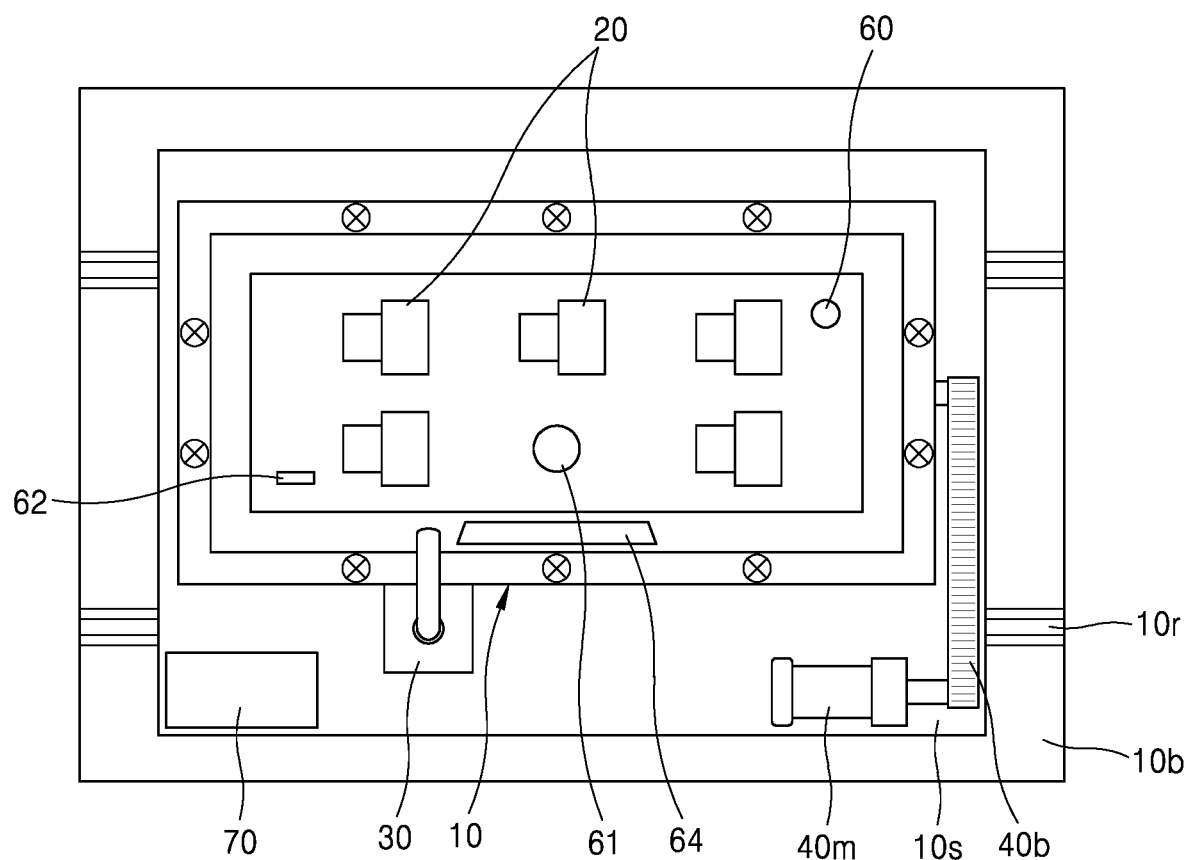
FIG. 4 is a top view illustrating the large capacity natural material composition conversion apparatus using the microwave of FIG. 1.
Figure 5:
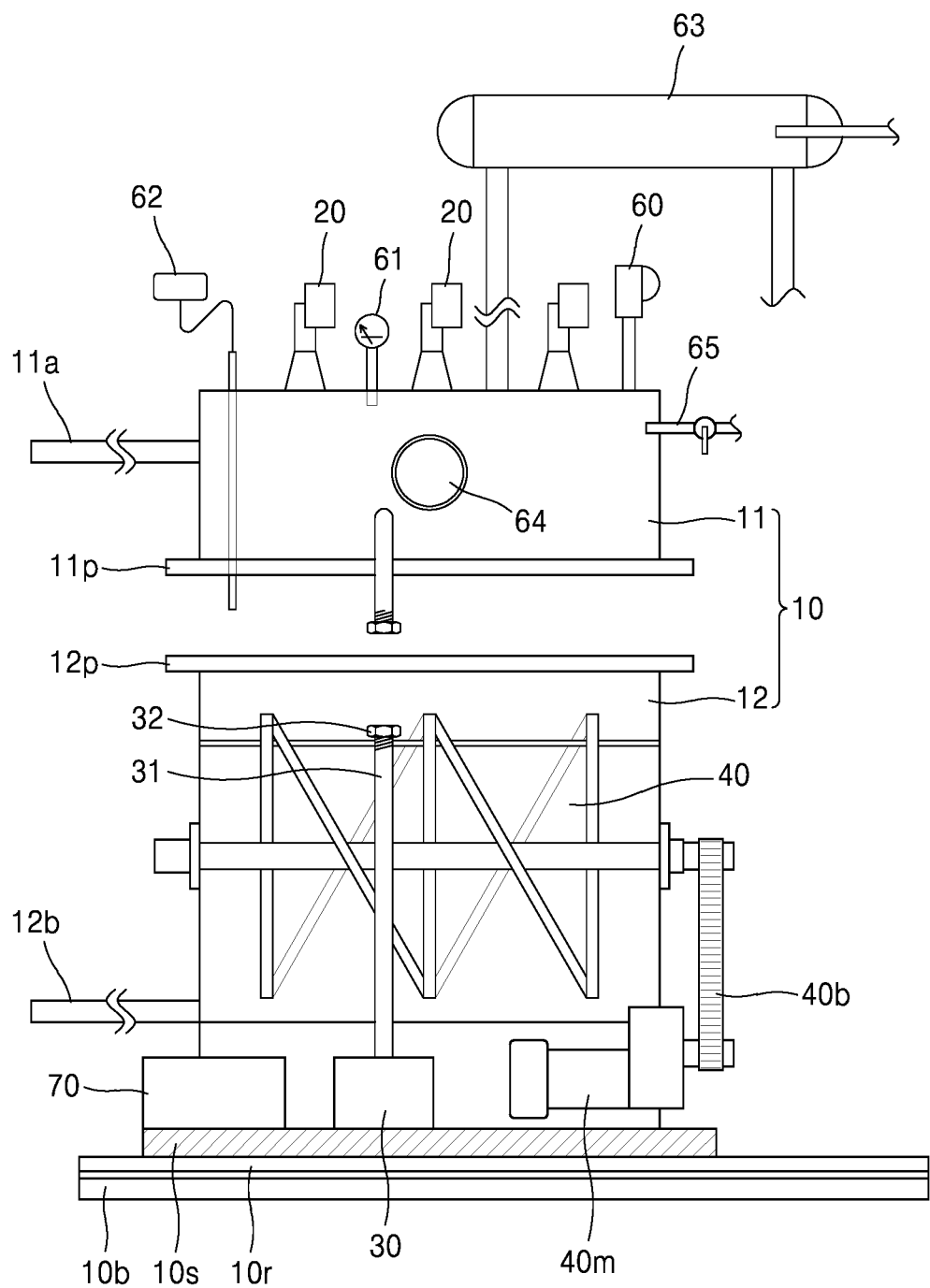
FIG. 5 is a front view illustrating an operation of the large capacity natural material composition conversion apparatus using the microwave of FIG. 1.
Figure 6:
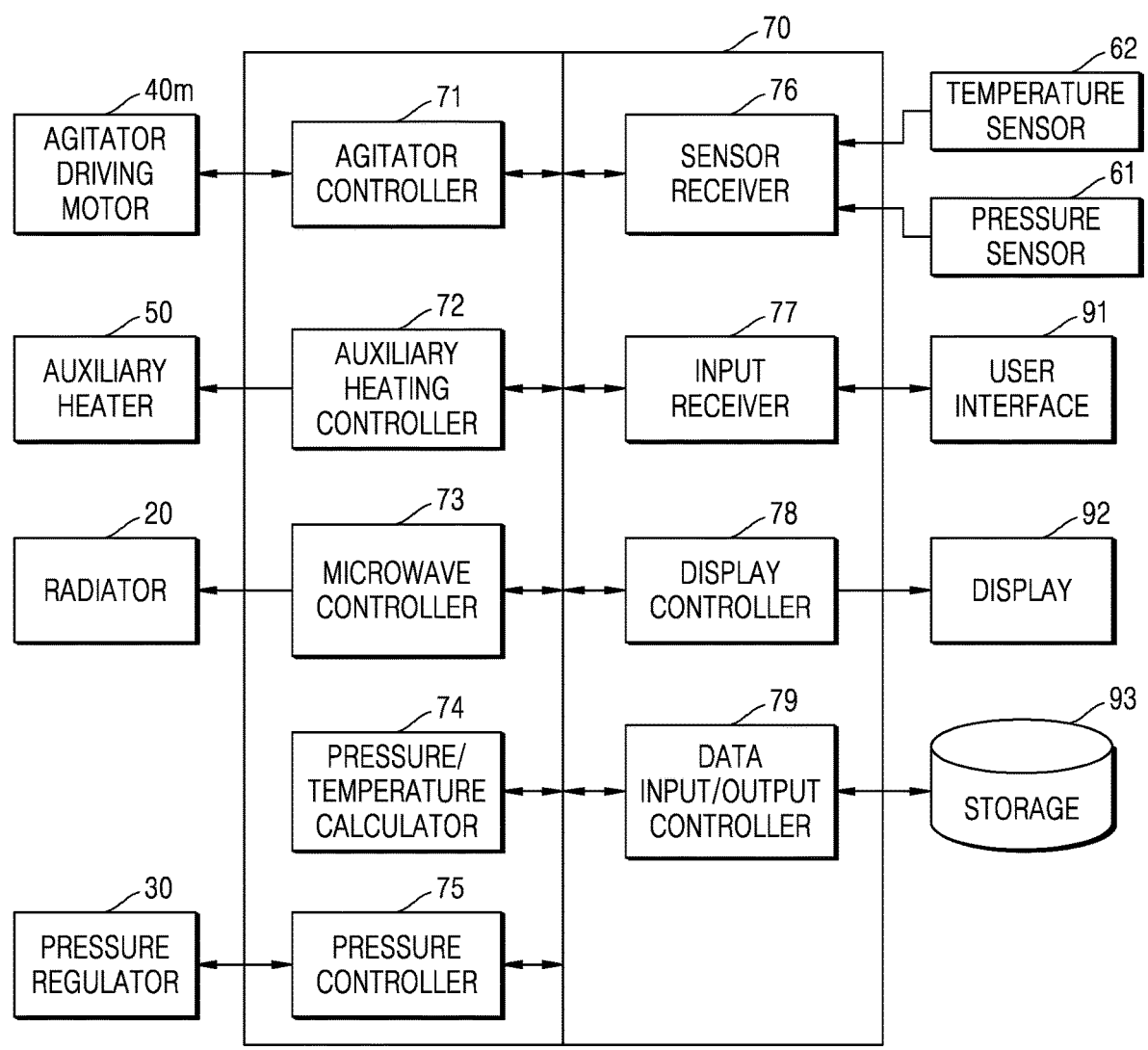
FIG. 6 is a block diagram illustrating a connection relationship between some elements of the large capacity natural material composition conversion apparatus using the microwave of FIG. 1.

FIG. 1 is a perspective view illustrating a large capacity natural material composition conversion apparatus using a microwave, according to an embodiment. FIG. 2 is a front view illustrating the large capacity natural material composition conversion apparatus using the microwave of FIG. 1. FIG. 3 is a side view illustrating the large capacity natural material composition conversion apparatus using the microwave of FIG. 1. FIG. 4 is a top view illustrating the large capacity natural material composition conversion apparatus using the microwave of FIG. 1. FIG. 5 is a front view illustrating an operation of the large capacity natural material composition conversion apparatus using the microwave of FIG. 1. FIG. 6 is a block diagram illustrating a connection relationship between some elements of the large capacity natural material composition conversion apparatus using the microwave of FIG. 1.

The large capacity natural material composition conversion apparatus using the microwave of FIGS. 1 through 6 includes a chamber 10 including a sealed reaction space which may accommodate a material including a natural product to be processed, an radiator 20 that heats the material accommodated in the reaction space by radiating a microwave into the reaction space of the chamber 10, a pressure regulator 30 that regulates a pressure of the reaction space by supplying a gas into the reaction space, and a controller 70 that controls the pressure regulator 30 and the radiator 20.

In the large capacity natural material composition conversion apparatus using the microwave of FIGS. 1 through 6, because the controller 70 may preliminarily increase a pressure of the reaction space by operating the pressure regulator 30 before operating the radiator 20 to heat the material, an environment for optimal heating may be created inside the reaction space in response to a kind of the material.

Also, unlike a conventional extraction method using a microwave, because the natural product may be processed in the chamber 10 including the sealed reaction space, a pressure formed during processing of the natural product may be maintained.

The chamber 10 includes a first division chamber 11 and a second division chamber 12. When the first division chamber 11 and the second division chamber 12 are coupled to each other, a sealed reaction space is formed inside the chamber 10 by the first division chamber 11 and the second division chamber 12.

A shape of each of the first division chamber 11 and the second division chamber 12 may be selected from among various shapes such as a hemispheric shape, a semi-cylindrical shape whose inside is empty, a hexahedral shape whose inside is empty and one side is open, and a triangular pyramid shape whose inside is empty and one side is open.

The first division chamber 11 and the second division chamber 12 of the chamber 10 may be made of a metal material such as stainless steel, steel, or an alloy. Each of the first division chamber 11 and the second division chamber 12 may have a thickness large enough to secure durability, robustness, and stability to withstand an internal pressure ranging from about 1 bar to about 15 bar.

Also, an inner surface of each of the first division chamber 11 and the second division chamber 12 may be coated with a material such as Teflon in order not to be affected by a microwave in the chamber 10 during a processing process.

Alternatively, in order not to be affected by a microwave, a part or the whole of each of the first division chamber 11 and the second division chamber 12 may be made of quartz.

An embodiment is not limited by a shape or a material of each of the first division chamber 11 and the second division chamber 12 of FIGS. 1 through 6, and each of the first division chamber 11 and the second division chamber 12 may be made of any of various shapes and materials in consideration of a type and a condition of a processing process performed in the chamber 10.

The chamber 10 is provided over a movable stage 10s. The movable stage 10s is movably provided over a fixed plate 10b. The second division chamber 12 is fixedly provided on the movable stage 10s, and the movable stage 10s is provided over the fixed plate 10b to linearly move along a straight rail 10r. Accordingly, in a state where the first division chamber 11 and the second division chamber 12 are separated from each other, the second division chamber 12 may move above the fixed plate 10b together with the movable stage 10s.

In the large capacity natural material composition conversion apparatus using the microwave of FIGS. 1 through 4, the first division chamber 11 and the second division chamber 12 are located at a coupled position. When the first division chamber 11 and the second division chamber 12 are located at the coupled position, a reaction space is formed inside an internal space between the first division chamber 11 and the second division chamber 12.

The first division chamber 11 includes a first flange 11p protruding outward and extending along an edge. The second division chamber 12 includes a second flange 12p protruding outward to correspond to the first flange 11p and extending along an edge. A fastening member 11f may connect the first flange 11p of the first division chamber 11 to the second flange 12p of the second division chamber 12, so that during processing of the natural product, the first division chamber 11 and the second division chamber 12 are maintained in a coupled state and a sealed state of the reaction space is maintained.

When the first division chamber 11 and the second division chamber 12 are located at the coupled position, the first division chamber 11 and the second division chamber 12 are fixed to each other by the fastening member 11f such as a bolt and a nut. The fastening member 11f firmly seals the reaction space between the first division chamber 11 and the second division chamber 12 in a state where the first division chamber 11 and the second division chamber 12 are coupled to each other, so that a microwave in the reaction space during processing of the natural product and vapor of a solvent generated during the processing are prevented from being leaked to the outside.

The fastening member 11f such as a bolt and a nut is merely an example, and an embodiment is not limited by a number, a size, a shape, or a position of the fastening member 11f and the fastening member 11f may be modified in various ways in consideration of a size and a shape of the chamber 10. Various other fastening members for maintaining a fixed state of the first division chamber 11 and the second division chamber 12 may be used as long as they may withstand a pressure formed in the reaction space as a processing is performed Examples of other fastening members may include a clamp, an assembly of a catch and a lever rotating by a hinge, a sealing device using a strong electromagnet, and a separate cover.

Referring to FIG. 5, as the first division chamber 11 moves upward, the first division chamber 11 and the second division chamber 12 may be separated from each other. In order to move the first division chamber 11 upward, a lifting chain 81 is coupled to a connector 82 provided outside the first division chamber 11. When a lifting device (e.g., a hoist or a hydraulic lift) connected to the lifting chain 81 operates, the first division chamber 11 may move upward away from the second division chamber 12.

Because an internal space of the second division chamber 12 is open to the outside in a state where the first division chamber 11 and the second division chamber 12 are separated from each other, an operation of accessing the internal space of the second division chamber 12 and then inputting a material including a natural product, retrieving an extract, or cleaning the internal space may be performed.

The radiator 20 is located in the first division chamber 11. The radiator 20 radiates a microwave into the reaction space formed by the first division chamber 11 and the second division chamber 12 in a state where the first division chamber 11 and the second division chamber 12 are coupled to each other. The radiator 20 may include, for example, a magnetron for radiating a microwave. A plurality of radiators 20 are located to radiate microwaves into an entire large reaction space for processing large amounts of natural products. The magnetron may adjust an intensity of microwave radiating power according to a capacity of the composition conversion apparatus and properties and an amount of a natural product that is an object to be processed. A magnetron having power of 3 kW or more may be used, the number and positions of the radiator(s) 20 may be modified in various ways according to a capacity and a shape of the composition conversion apparatus.

Also, in the first division chamber 11, a temperature sensor 62 that measures a change in a temperature of an object to be processed accommodated in the reaction space, a pressure sensor 61 that measures an internal pressure of the reaction space, an agitator 40 that agitates the object to be processed by rotating an end portion, an emergency pressure discharger 60 that operates by detecting an abnormal situation of the internal pressure to prevent an explosion, and an exhaust valve 65 through which a residual pressure of the reaction space after processing is discharged to the outside or external air is injected into the reaction space. Structures, positions, and numbers of elements located in the first division chamber 11 shown in FIGS. 1 through 6 are merely examples, and the elements may be located in the second division chamber 12 according to a capacity of the composition conversion apparatus or properties of a natural product material or an additional device and an auxiliary function may be added when necessary.

The temperature sensor 62 may pass through the first division chamber 11 and may be connected to a probe extending to the reaction space of the first division chamber 11, to measure a change in a temperature of a material accommodated in the reaction space.

The first division chamber 11 includes a monitoring window 64 formed of a transparent material that allows the inside to be seen from the outside. Also, the first division chamber 11 includes an inlet pipe 11a formed at a side to allow an external material to be put thereinto. The second division chamber 12 includes a discharge pipe 12b formed at a side to discharge an extracted material after a processing process ends.

A refrigerant condenser 63 is connected to the first division chamber 11. During microwave processing, the refrigerant condenser 63 stops operating to maintain a pressure inside the chamber 10, and after the processing is completed, the refrigerant condenser 63 operates to condense the processed object. Because the refrigerant condenser 63 is connected to a vacuum pump (not shown) through a pressure pipe 63p, the refrigerant condenser 63 may retrieve an evaporated solvent from the processed object existing in the chamber 10 and discharges the solvent to a solvent recovery pipe 63r. The refrigerant condenser 63 may use a water cooling method of cooling a refrigerant by using cooling water.

The agitator 40 is located to pass through the second division chamber 12. When an agitator driving motor 40m located outside the second division chamber 12 operates, the agitator 40 connected to the agitator driving motor 40m by a belt 40b rotates, to agitate a material that is a mixture of the solvent and the object to be processed put into the reaction space. The solvent contained in the material may be a solvent selected from among water, a mixed solution of water and ethanol, nucleic acid, ethyl acetate, a mixed solution of ethanol and ethyl acetate, acetone, and a mixed solution of water and acetone.

The second division chamber 12 includes an auxiliary heater 50. The auxiliary heater 50 surrounds the whole or a part of the second division chamber 12. When electricity is applied, the auxiliary heater 50 generates heat to auxiliarily heat the reaction space. A position of the auxiliary heater 50 illustrated in FIG. 2 is merely an example, and the auxiliary heater 50 may be provided in the first division chamber 11, or may be provided in both the first division chamber 11 and the second division chamber 12.

Referring to FIG. 6, the controller 70 may be electrically connected to various elements such as the radiator 20, the pressure regulator 30, the temperature sensor 62, the pressure sensor 61, the agitator driving motor 40m, the emergency pressure discharger 60, the exhaust valve 65, a user interface 91, a display 92, and a storage 93. The controller 70 may be implemented by a control computer, a circuit board, a programmable controller, a control chip mounted on a circuit board, software, or the like.

The controller includes an agitator controller 71 that controls an operation of the agitator driving motor 40m, an auxiliary heating controller 72 that controls an operation of the auxiliary heater 50, a microwave controller 73 that controls an operation of the radiator 20, a pressure/temperature calculator 74 that calculates a target pressure and a target temperature of the reaction space which are environmental conditions for processing the material, a pressure controller 75 that controls an operation of the pressure regulator 30, a sensor receiver 76 that receives signals of the temperature sensor 62 and the pressure sensor 61, an input receiver 77 that receives input information of a user, a display controller 78 that controls an operation of the display 92, and a data input/output controller 79 that outputs data to the storage 93 or receives data from the storage 93.

The controller 70 may receive a temperature signal and a pressure signal from the temperature sensor 62 and the pressure sensor 61, and may control operations of the radiator 20, the agitator driving motor 40m, the emergency pressure discharger 60, and the exhaust valve 65 based on information input by the user transmitted from the user interface 91 and control information previously stored in the storage 93.

The user interface 91 that receives the input information of the user may include various types of input devices such as a touchscreen, a combination of input buttons, an emergency stop button, a mouse, a joystick, and a keyboard.

Embodiments are not limited by a method by which the user interface 91 is directly mounted on the large capacity natural material composition conversion apparatus using the microwave. For example, the user interface 91 implemented as a teaching pendant or a teaching box including buttons, a switch, and a touch panel that may be manipulated by the user by being connected by a control cable to the large capacity natural material composition conversion apparatus may be used.

Also, the user interface 91 does not necessarily have to be connected by wire to the controller 70. For example, the user interface 91 may be implemented as a wireless terminal that is connected to the controller 70 by using a wireless communication method and transmits information selected by the user to the controller 70.

The microwave controller 73 controls an intensity of a microwave radiated by the radiator 20. The controller 70 may control an intensity of a microwave radiated by the radiator 20 by controlling the microwave controller 73 based on input information (e.g., information such as a kind of an object to be processed, a kind of a used solvent, a capacity of the object to be processed, a processing temperature, a pressing pressure, and an agitating speed) of the user input through the user interface 91, and may change the intensity of the microwave based on a measurement signal input from the temperature sensor 62 and the pressure sensor 61.

The controller 70 may control the radiator 20 and the pressure regulator 30 based on information on at least one of a heating temperature for heating the material in response to a kind of the material accommodated in the reaction space of the chamber 10, a preliminary pressure condition formed inside the reaction space before the material is heated, and a time for heating the material (processing time).

The pressure regulator 30 may include a gas supply device for supplying any one of helium, argon, nitrogen, air, and oxygen, or a mixture thereof into the reaction space, and a flow control valve. When the first division chamber 11 and the second division chamber 12 are separated from each other, a supply pipe 31 of the pressure regulator 30 may be separated by a connection device 32.

The information on the kind of the material accommodated in the reaction space may be transmitted to the controller 70 through the user interface 91. For example, the controller 70 may display, on the display 92, information on various kinds of natural products that may be processed, that is, a name of a natural product and a volume and/or a weight of the natural product that may be put into the reaction space. When the user manipulates the user interface 91 in a state where the information is displayed on the display 92 to select a kind and a volume of a material to be processed, information on a kind of the material is transmitted to the controller 70.

Also, when information on a standard processing time required to process the material is stored in the storage 93, the controller 70 may display, on the display 92, a menu that allows the user to freely adjust and select an estimated time required for processing and an actual processing time. For example, when the user chooses to perform processing in a shorter time than the standard processing time, the controller 70 may increase a target boiling point of the material by supplying a gas through the pressure regulator 30 before the material is heated to increase a preliminary pressure condition to be formed in the reaction space.

The controller 70 may extract information related to the kind of the material selected by the user from the storage 93. For example, processing information on an 'A material' that is a natural product and an 'a solvent' to be used to process the 'A material' may be previously stored in the storage 93. The processing information may include information such as a temperature related to a boiling point of a mixture of the 'A material' and the 'a solvent', a pressure, and a time required for processing.

Referring to FIG. 6, the pressure/temperature calculator 74 may calculate a target temperature and a target pressure required to heat the material based on the processing information corresponding to the material transmitted from the storage 93, and the pressure controller 75 may control the pressure regulator 30 and the microwave controller 73 may control the radiator 20 based on a calculation result of the pressure/temperature calculator 74. When a higher heating temperature condition is required according to the kind of the material, the auxiliary heating controller 72 may operate the auxiliary heater 50 to perform an auxiliary heating function.

Also, the material accommodated in the reaction space of the chamber 10 may be a mixture of a solvent and a natural product. The controller 70 may control the radiator 20 and the pressure regulator 30 based on information on a preliminary pressure condition formed inside the reaction space before the material is heated in response to a kind of the solvent.

For example, the controller 70 may display, on the display 92, information on various kinds of natural products that may be processed such as a name of a natural product and a volume and/or a weight of the natural product that may be put into the reaction space, and information on a solvent usable for the natural product such as a name of the solvent, and a volume and/or a weight of the solvent. When the user manipulates the user interface 91 in a state where the information is displayed on the display 92 to select a kind and a volume of a material to be processed and/or a kind and a volume of a solvent, the selected information is transmitted to the controller 70.

Also, the controller 70 may control the radiator 20 and the pressure regulator 30 based on information on a boiling point of the material accommodated in the reaction space.

For example, the controller 70 may display, on the display 92, information on various kinds of natural products that may be processed such as a name of a natural product and a volume and/or a weight of the natural product that may be put into the reaction space, information on a solvent usable for the natural product such as a name of the solvent and a volume and/or a weight of the solvent, and information on a boiling point associated with a mixture of the natural product and the solvent such as a temperature and a pressure. When the user manipulates the user interface 91 in a state where the information is displayed on the display 92 to select a kind and a volume of a material to be processed, a kind and a volume of a solvent, and/or a boiling point, the selected information is transmitted to the controller 70.

Also, the controller 70 may change pressure and temperature conditions of the reaction space in accordance with various steps of processing the material. A natural product processing process may include multiple steps such as a deglycosylation process, a dehydration process, a decarboxylation process and a degradation process. The controller 70 may select steps to be sequentially performed from among multiple steps according to characteristics of the material put into the reaction space, and may sequentially perform the steps. Also, when the steps are sequentially performed, target temperature and target pressure conditions suitable for each step may be selected and a heating temperature and a pressure of the reaction space may be regulated.

An operation of the large capacity natural material composition conversion apparatus using the microwave including the above elements will be described as follows.

In a state where the first division chamber 11 of the reaction space of the large capacity natural material composition conversion apparatus using the microwave moves upward, a mixture of a natural product material that is an object to be processed and a solvent or an organic solvent selected from among water, a mixed solution of water and ethanol, nucleic acid, ethyl acetate, a mixed solution of ethanol and ethyl acetate, acetone, and a mixed solution of water and acetone is put into the second division chamber 12.

The natural product material may be dried powder of an extract or may be ground into powder. Alternatively, the natural product material may be dried powder of an extract that may be dissolved in the solvent.

Although a mixing ratio of the natural product material and the solvent may vary depending on a processing capacity of the composition conversion apparatus and properties of a material, a volume of the solvent may be usually 2 to 10 times a volume of a solute that is an object to be processed, and preferably, 3 to 5 times.

After the mixture that is an object to be processed is put into the second division chamber 12, the first division chamber 11 moves downward so that the first division chamber 11 and the second division chamber 12 contact each other. The first division chamber 11 and the second division chamber 12 are tightly fixed by using the fastening member 11f in a state where the first division chamber 11 and the second division chamber 12 are coupled to each other. A reaction space formed by the first division chamber 11 and the second division chamber 12 may be firmly sealed by the fastening member 11f.

When an object to be processed is prepared in a dissolved state by adding a non-concentrated liquid extract or a certain proportion of solvent, first, the first division chamber 11 and the second division chamber 12 are tightly fixed by using the fastening member 11f in a state where the first division chamber 11 and the second division chamber 12 are coupled to each other, and an object to be processed may be put into the chamber 10 by being injected through the inlet pipe 11a at a side of the first division chamber 11.

The user selects the natural product material and the solvent by manipulating the user interface 91, may input information such as a processing temperature, a pressure, a time, and a rotation speed of the agitator 40, and then may start a processing process.

Before the radiator 20 performs a heating operation, the pressure regulator 30 may operate to form a preliminary pressure in the reaction space. When the pressure regulator increases a pressure inside the reaction space, a boiling point at which the material accommodated in the reaction space begins to boil may increase, and thus a natural product extraction process may be performed under a higher temperature condition. Also, because the natural product extraction process may be performed in a high temperature condition, the natural product extraction process may be more rapidly completed.

When the pressure inside the reaction space reaches a target pressure, the radiator 20 performs a heating operation by radiating a microwave into the reaction space. An intensity of the microwave radiated by the radiator 20 is automatically adjusted by the microwave controller 73 based on a preset temperature. When it is difficult to reach a target heating temperature condition by using only the radiator 20, the auxiliary heater 50 may auxiliarily operate.

After natural product processing ends, the radiator 20 stops operating, and cooling air is supplied to an outer surface of the chamber 10 to cool the chamber 10 to a room temperature. In order to supply the cooling air, a separate ventilation device may be provided outside the chamber 10.

While the chamber 10 is cooled, the exhaust valve 65 may be opened to discharge a residual pressure of the reaction space after processing to the outside. Alternatively, after the chamber 10 is sufficiently cooled, the exhaust valve 65 of the first division chamber 11 may be opened to remove a residual pressure inside the reaction chamber. A large amount of solvent contained in the material to process the object to be processed may be condensed or retrieved. The solvent may be condensed or retrieved through the refrigerant condenser 63 by operating a vacuum pump connected to the refrigerant condenser 63.

After the residual pressure is removed from the reaction space, the first division chamber 11 and the second division chamber 12 may be separated from each other by unlocking the fastening member 11*f*. When the first division chamber 11 is raised away from the second division chamber 12, the first division chamber 11 and the second division chamber 12 are separated from each other. After the first division chamber 11 moves downward and is completely separated from the second division chamber 12, processed contents accommodated in the second division chamber 12 may be retrieved.

An embodiment is not limited by the above operation of separating the first division chamber 11 from the second division chamber 12 to retrieve the processed contents from the second division chamber 12. For example, when the processed contents is extracted in a liquid state, the processed contents may be retrieved through the discharge pipe 12*b* formed at a side of the second division chamber 12. Only when the processed contents is in a solid state or when a special-purpose operation such as removal of a residue remaining in the second division chamber 12, cleaning, repair, replacement of an impeller of the agitator 40, or disinfect is performed, the first division chamber 11 and the second division chamber 12 may be separated from each other.

In order to more conveniently retrieve the processed contents accommodated in the second division chamber 12 or more conveniently perform a cleaning operation, the movable stage 10*s* on which the second division chamber 12 is provided may move along the straight rail 10*r* of the fixed plate 10*b*. When the second division chamber 12 and the movable stage 10*s* move relative to the fixed plate 10*b*, an upper opening of the second division chamber 12 is completely open to the outside, thereby making it possible to conveniently perform an operation of retrieving or cleaning the processed residue.

According to the large capacity natural material composition conversion apparatus of FIGS. 1 through 6, before a material accommodated in a reaction space is heated, a boiling point of the material may be increased by increasing an internal pressure of the reaction space to a preliminary pressure condition. Accordingly, because a natural product is processed in a higher temperature condition, a high-quality extract may be obtained. Also, because a boiling point may be adjusted in accordance with combination conditions of various natural products and solvents, a degree of freedom of operating the large capacity natural material composition conversion apparatus may be improved.

Figure 7:
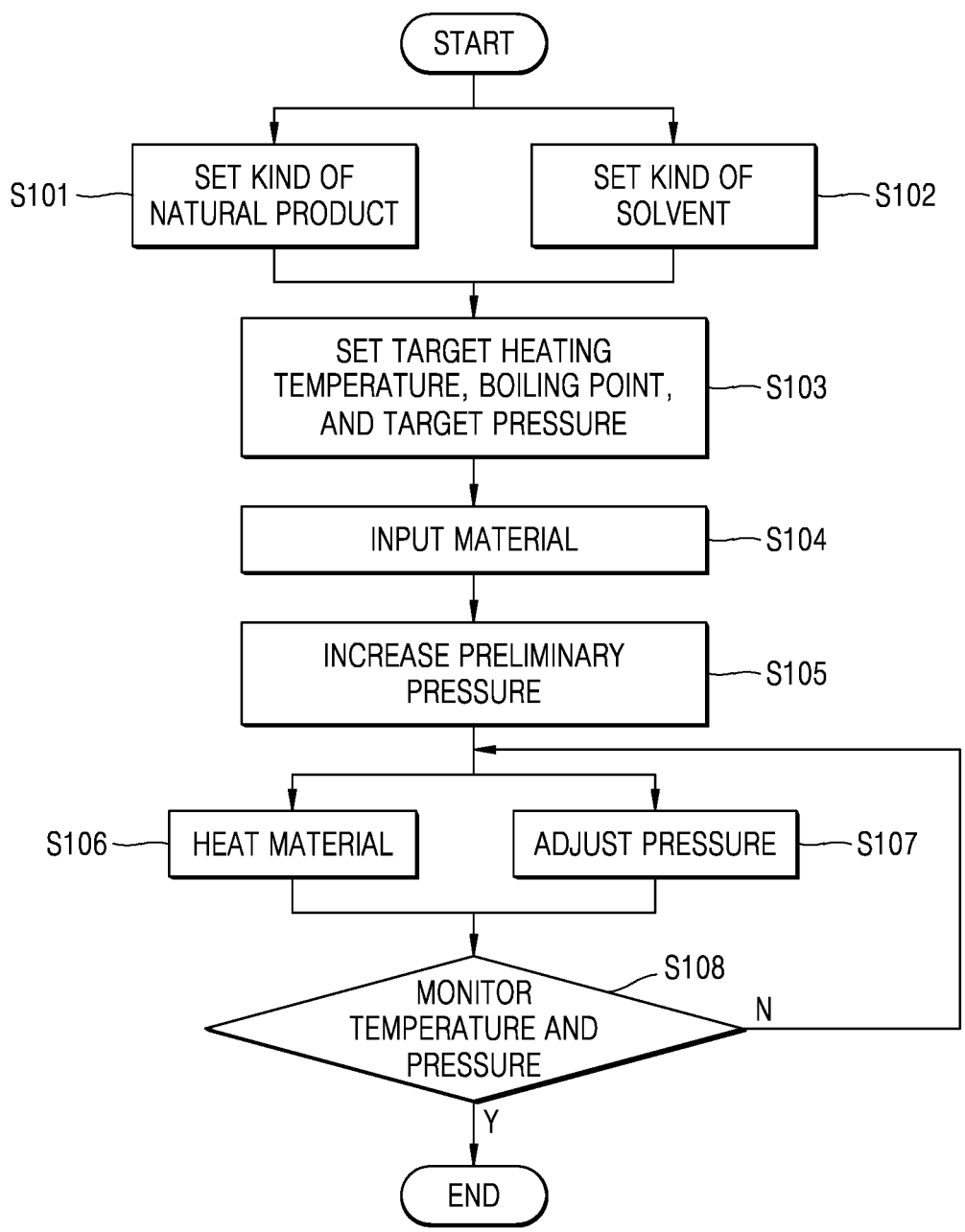
FIG. 7 is a flowchart illustrating operations of a large natural product processing method using a microwave, according to another embodiment.

FIG. 7 is a flowchart illustrating operations of a large natural product processing method using a microwave, according to another embodiment.

The large capacity natural material composition conversion apparatus of FIGS. 1 through 6 may perform the processing method according to the operations of the flowchart of FIG. 7.

The large natural product processing method using the microwave includes operation S101 in which a kind of a natural product is set, operation S102 in which a kind of a solvent is set, operation S103 in which a target heating temperature, a boiling point, and a target pressure are determined, operation S104 in which a material that is a mixture of the solvent and the natural product is put into a reaction space, operation S105 in which a preliminary pressure (pre-pressure) of the reaction space is increased by injecting a gas into the reaction space, operation S106 in which the material accommodated in the reaction space is heated by driving an radiator and an auxiliary heater, operation S107 in which a pressure of the reaction space is adjusted, and operation S108 in which a temperature and a pressure of the reaction space are monitored.

According to the large natural product processing method of FIG. 7, before a material accommodated in a reaction space is heated, a boiling point of the material may be increased by increasing an internal pressure of the reaction space to a preliminary pressure condition. Accordingly, because a natural product is processed in a higher temperature condition, a high-quality extract may be obtained. Also, because a boiling point may be adjusted in accordance with combination conditions of various natural products and solvents, a degree of freedom of operating the large capacity natural material composition conversion apparatus may be improved.

Figure 8:
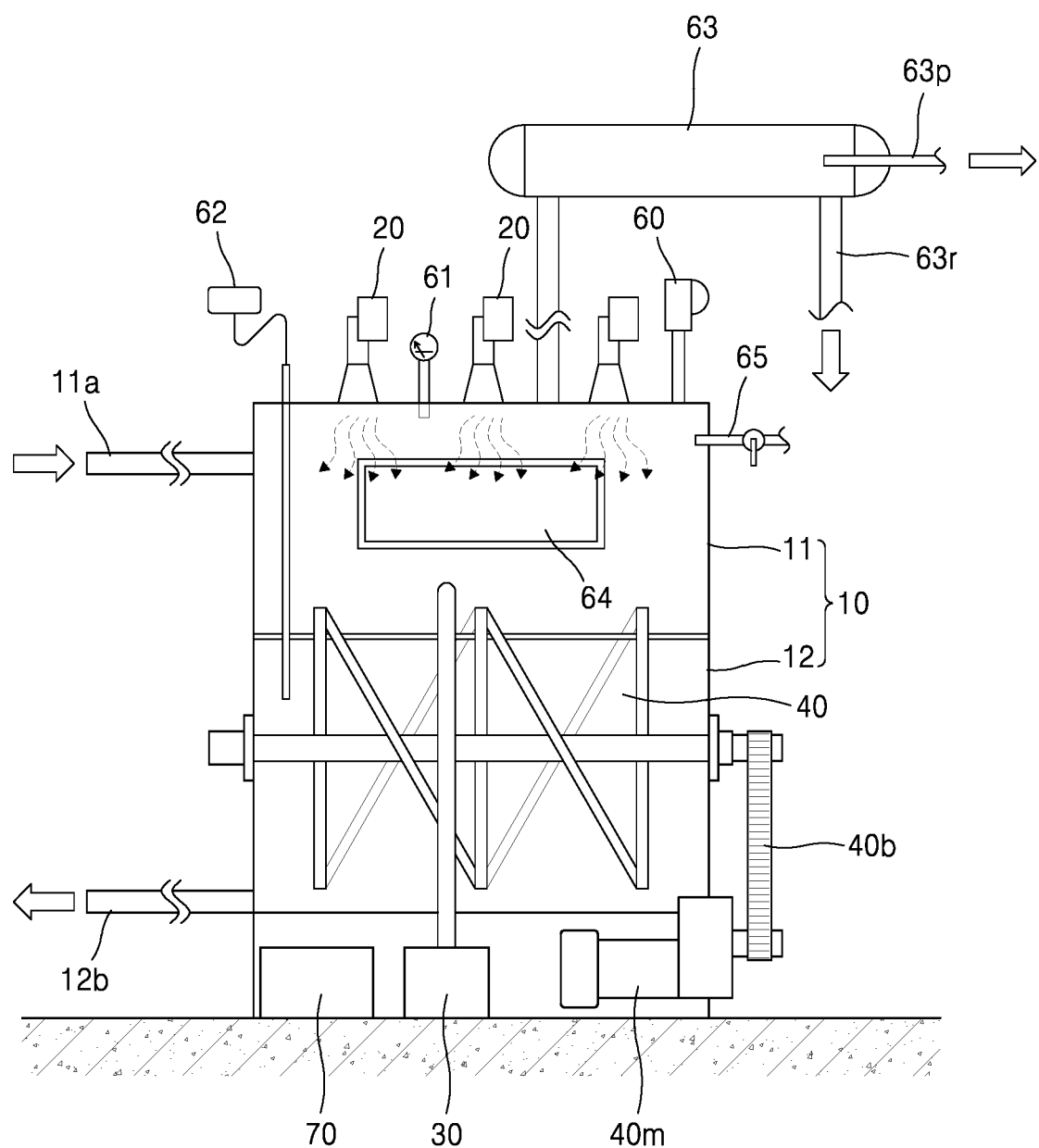
FIG. 8 is a front view illustrating a large capacity natural material composition conversion apparatus using a microwave, according to another embodiment.

FIG. 8 is a front view illustrating a large capacity natural material composition conversion apparatus using a microwave, according to another embodiment.

The large capacity natural material composition conversion apparatus using the microwave of FIG. 8 is similar to the composition of the large capacity natural material composition conversion apparatus using the microwave of FIGS. 1 through 6, except that the second division chamber 12 is fixedly installed on the floor in order to be suitable for a case where an object to be processed is liquid or to be suitable for a repetitive process for processing a material that does not need to remove a residue after processing. Also, the first division chamber 11 and the second division chamber 12 are completely fixedly coupled to each other in a non-separable state, to form the chamber 10.

In order to perform a natural product processing operation, a mixture of a solvent or an organic solvent prepared with water or a mixed solution of water and ethanol and a natural product material that is an object to be processed is put into a reaction space inside the chamber 10 through the inlet pipe 11*a* formed at a side of the first division chamber 11.

In this case, a preliminary pressure may be formed by the pressure regulator 30 in the reaction space. Alternatively, after the mixture is put into the reaction space of the chamber 10, a pressure of the reaction space may be preliminarily adjusted by operating the pressure regulator 30 before the radiator 20 performs a heating operation.

When the pressure inside the reaction space reaches a target pressure, the radiator 20 performs a heating operation by radiating a microwave into the reaction space. An intensity of the microwave radiated by the radiator 20 is automatically adjusted by the microwave controller 73 based on a preset temperature. When it is difficult to reach a target heating temperature condition by using only the radiator 20, the auxiliary heater 50 may auxiliarily operate.

After natural product processing ends, the radiator 20 stops operating, and cooling air is supplied to an outer surface of the chamber 10 to cool the chamber 10 to a room temperature. In order to supply the cooling air, a separate ventilation device may be provided outside the chamber 10.

While the chamber 10 is cooled, the exhaust valve 65 may be opened to discharge a residual pressure of the reaction space after processing to the outside.

After the residual pressure of the reaction space is removed, a gas may be injected into the reaction space through the pressure regulator 30 and processed contents may be discharged to the outside through the discharge pipe 12b formed at a lower end of the chamber 10. A recovery pump for forming a vacuum pressure may be connected to the discharge pipe 12b to retrieve contents having high viscosity.

According to the large capacity natural material composition conversion apparatus of FIG. 8, before a material accommodated in a reaction space is heated, a boiling point of the material may be increased by increasing an internal pressure of the reaction space to a preliminary pressure condition. Accordingly, because a natural product is processed in a higher temperature condition, a high-quality extract may be obtained. Also, because a boiling point may be adjusted in accordance with combination conditions of various natural products and solvents, a degree of freedom of operating the large capacity natural material composition conversion apparatus may be improved.

Figure 9:
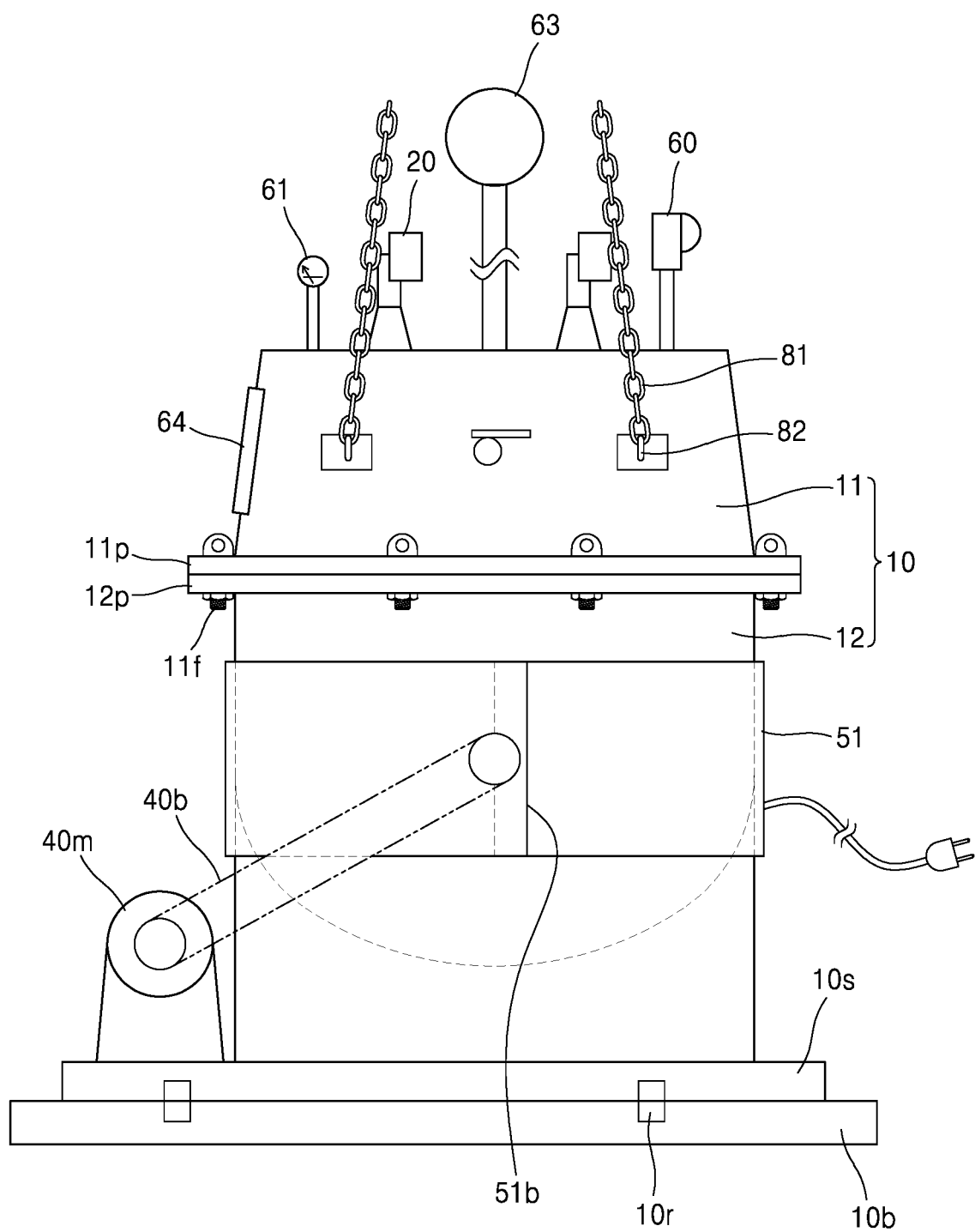
FIG. 9 is a side view illustrating a large capacity natural material composition conversion apparatus using a microwave, according to another embodiment.

FIG. 9 is a side view illustrating a large capacity natural material composition conversion apparatus using a microwave, according to another embodiment.

A configuration of the large capacity natural material composition conversion apparatus using the microwave of FIG. 9 is almost the same as that of the large capacity natural material composition conversion apparatus of FIG. 3, except that an auxiliary heater 51 is provided outside the second division chamber 12.

The auxiliary heater 51 may be manufactured to be entirely flexible, and may surround an outer surface of the second division chamber 12. Also, the auxiliary heater 51 may be separated from the second division chamber 12.

The auxiliary heater 51 may include, for example, a support layer including an asbestos material, and an electric resistance heater located on the support layer and configured to generate heat when external electricity is applied. When the auxiliary heater 51 is located outside the second division chamber 12 and then facing ends of an edge of the auxiliary heater are fixed by using a fixing means 51b, a state where the auxiliary heater 51 is mounted outside the second division chamber 12 may be stably maintained. Examples of the fixing means 51b for fixing the facing ends of the edge of the auxiliary heater 51 may include a Velcro, a button, a hook-shaped latch, a clip, and a magnetic body.

According to the large capacity natural material composition conversion apparatus using the microwave constructed as described above, because the auxiliary heater 51 is installed outside the second division chamber 12 and power is supplied to the auxiliary heater 51 while a processing process is performed, the auxiliary heater 51 may perform an auxiliary heating function. After the processing process is completed, the auxiliary heater 51 may be separated from the second division chamber 12.

Figure 10:
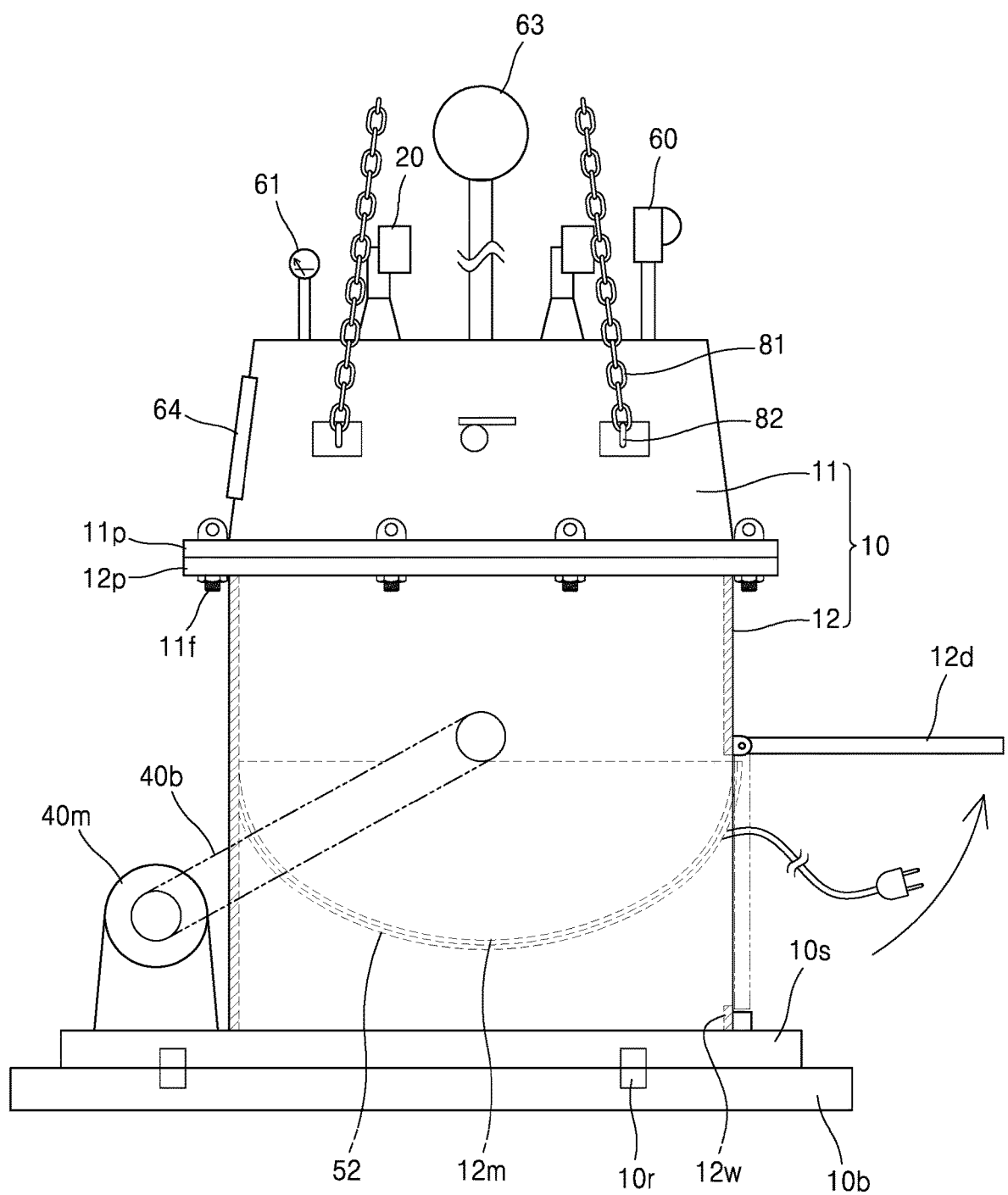
FIG. 10 is a side view illustrating a large capacity natural material composition conversion apparatus using a microwave, according to another embodiment.

FIG. 10 is a side view illustrating a large capacity natural material composition conversion apparatus using a microwave, according to another embodiment.

A configuration of the large capacity natural material composition conversion apparatus using the microwave of FIG. 10 is almost the same as that of the large capacity natural material composition conversion apparatus of FIG. 3, except that an auxiliary heater 52 is provided to surround an internal mantle 12m that forms a reaction space inside the second division chamber 12.

The internal mantle 12m is located inside the second division chamber 12. The internal mantle 12m may have a hollow hemispheric shape or semi-cylindrical shape designed to form at least a portion of the reaction space. The second division chamber 12 extends in a circumferential direction to surround the internal mantle 12m. The second division chamber 12 includes an open passage 12w with at least one open portion to access the inside of the second division chamber 12 from the outside of the second division chamber 12. An openable/closable door 12d is provided in the open passage 12w.

Because the open passage 12w is opened to be accessible when the openable/closable door 12d is opened, the auxiliary heater 52 may be inserted into the second division chamber 12 through the open passage 12w and may be installed to surround a lower portion of the internal mantle 12m. Also, the auxiliary heater 52 may be separated from the internal mantle 12m.

Because the auxiliary heater 52 is manufactured to be entirely flexible and have a shape corresponding to an outer shape of the internal mantle 12m, the auxiliary heater 52 may surround at least a portion of an outer surface of the internal mantle 12m. The auxiliary heater 52 may include, for example, a support layer including an asbestos material, and an electric resistance heater located on the support layer and configured to generate heat when external electricity is applied.

According to the large capacity natural material composition conversion apparatus using the microwave constructed as described above, because the auxiliary heater 52 is installed outside the internal mantle 12m and power is supplied to the auxiliary heater 52 while a processing process is performed, the auxiliary heater 52 may perform an auxiliary heating function. After the processing process is completed, the auxiliary heater 52 may be separated from the internal mantle 12m.

According to a large capacity natural material composition conversion apparatus using a microwave with a preset pressure function according to the one or more embodiments, a natural material may be processed in high temperature and high pressure conditions in a chamber with a sealed reaction space, thereby accelerating the conversion of natural ingredients.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A natural material composition conversion apparatus using a microwave, the natural material composition conversion apparatus comprising:
   a chamber comprising a sealed reaction space configured to accommodate a material including a mixture of a solvent and a natural product;
   a radiator configured to heat the material by radiating the microwave into the reaction space;
   a pressure regulator configured to regulate a pressure of the reaction space by supplying a gas into the reaction space; and
   a controller configured to:
      control the pressure regulator and the radiator based on information on a boiling point of the material;
      control the pressure regulator to preliminarily increase the pressure of the reaction space based on information on a preliminary pressure condition to be formed in the reaction space in response to a type of the solvent to increase the boiling point of the material before heating the material; and
      control the radiator to heat the material when the preliminarily increased pressure of the reaction space reaches a target pressure.

2. The natural material composition conversion apparatus of claim 1, further comprising an agitator arranged in the reaction space and configured to agitate the material.

3. The natural material composition conversion apparatus of claim 1, further comprising an auxiliary heater surrounding at least a part of the reaction space and configured to auxiliarily heat the material by transferring heat toward the reaction space.

4. The natural material composition conversion apparatus of claim 3, wherein the auxiliary heater surrounds at least a part of an outer surface of the chamber, is configured to generate heat being operated by an external electrical signal, and is separable from the chamber.

5. The natural material composition conversion apparatus of claim 3, wherein the chamber further comprises an internal mantle for forming at least a part of the reaction space, and
   wherein the auxiliary heater is arranged inside the chamber to surround at least a part of an outer surface of the internal mantle, is configured to generate heat being operated by an external electrical signal, and is separable from the internal mantle.

6. The natural material composition conversion apparatus of claim 1, wherein the controller is further configured to control the radiator and the pressure regulator based on information on at least one of a heating temperature for heating the material in response to a kind of the material accommodated in the reaction space, the preliminary pressure condition to be formed in the reaction space, and a time for heating the material.

7. The natural material composition conversion apparatus of claim 1, wherein the chamber comprises a plurality of division chambers that are coupled to one another to form the reaction space, and the plurality of division chambers are separable.

8. The natural material composition conversion apparatus of claim 7, wherein the chamber is provided over a movable plate, and
   wherein the movable plate is movably provided over a fixed plate.

9. The natural material composition conversion apparatus of claim 8, wherein the plurality of division chambers include a first division chamber and a second division chamber,
   wherein the first division chamber is provided above the second division chamber toward an upper portion of the chamber, and
   wherein the second division chamber is fixedly provided on the movable plate to move above the fixed plate together with the movable plate.

10. The natural material composition conversion apparatus of claim 8, wherein the movable plate is provided over the fixed plate to linearly move along a straight rail.

11. The natural material composition conversion apparatus of claim 1, wherein the pressure regulator comprises a gas supply device for supplying any one of helium, argon, nitrogen, air, and oxygen, or a mixture thereof into the reaction space.

* * * * *